United States Patent [19]
Wiltzer et al.

[11] Patent Number: 5,646,191
[45] Date of Patent: Jul. 8, 1997

[54] METHOD AND APPARATUS FOR THE PRODUCTION OF POLYAMIDE 6 FROM POLYAMIDE WASTE

[75] Inventors: Karl-Heinz Wiltzer, Bad Blankenburg; Peter Lausmann, Rudolstadt-Schwarza; Baldur Ebert, Bad Blankenburg, all of Germany

[73] Assignee: Polymer Engineering GmbH, Germany

[21] Appl. No.: 438,487

[22] Filed: May 10, 1995

Related U.S. Application Data

[63] Continuation of Ser. No. 189,067, Jan. 28, 1994, abandoned.

[30] Foreign Application Priority Data

Jan. 28, 1993 [EP] European Pat. Off. .............. 93101273

[51] Int. Cl.$^6$ .............................. C08J 11/14; B01D 39/00
[52] U.S. Cl. .......................... 521/49.8; 528/499; 528/500; 422/131; 422/184.1; 210/500.25; 210/806; 210/808
[58] Field of Search .................. 521/49.8; 526/914; 528/499, 500; 422/184, 131; 210/806, 808, 500.25

[56] References Cited

U.S. PATENT DOCUMENTS

| | | | |
|---|---|---|---|
| 2,343,174 | 2/1944 | Edison | 521/49.8 |
| 2,348,751 | 5/1944 | Peterson | 521/49.8 |
| 2,742,440 | 4/1956 | Stott | 521/49.8 |
| 4,051,212 | 9/1977 | Grigat | 521/49.8 |
| 4,605,762 | 8/1986 | Mandoki | 562/483 |
| 4,921,607 | 5/1990 | Langley | 210/266 |
| 5,169,870 | 12/1992 | Corbin | 521/49.8 |
| 5,272,221 | 12/1993 | Kitao et al. | 525/420 |
| 5,294,707 | 3/1994 | Kotek | 540/540 |
| 5,359,062 | 10/1994 | Fuchs et al. | 540/540 |

FOREIGN PATENT DOCUMENTS

| | | | |
|---|---|---|---|
| 243587 | 5/1960 | Australia | 521/49.8 |
| 691848 | 8/1969 | Canada | 521/49.8 |
| 0048340 | 7/1993 | European Pat. Off. . | |
| 264119 | 3/1991 | Germany . | |
| 2440243 | 11/1994 | Germany . | |
| 921667 | 3/1963 | United Kingdom | 521/49.8 |

*Primary Examiner*—Paul R. Michl
*Assistant Examiner*—Olga Asinovsky
*Attorney, Agent, or Firm*—Ostrolenk, Faber, Gerb & Soffen, LLP

[57] ABSTRACT

In a method for the depolymerization and reprocessing of material which consists of polyamide 6 waste and/or oligomer-containing polyamide 6 waste and/or oligomer-containing lactam residues and/or oligomer-containing lactam by hydrolysis in a pressure reactor with the addition of water, the material is melted and the melt is conducted continuously at predetermined temperature through the pressure reactor the inside pressure of which is controlled by the dosaged feeding of water or steam.

10 Claims, 1 Drawing Sheet

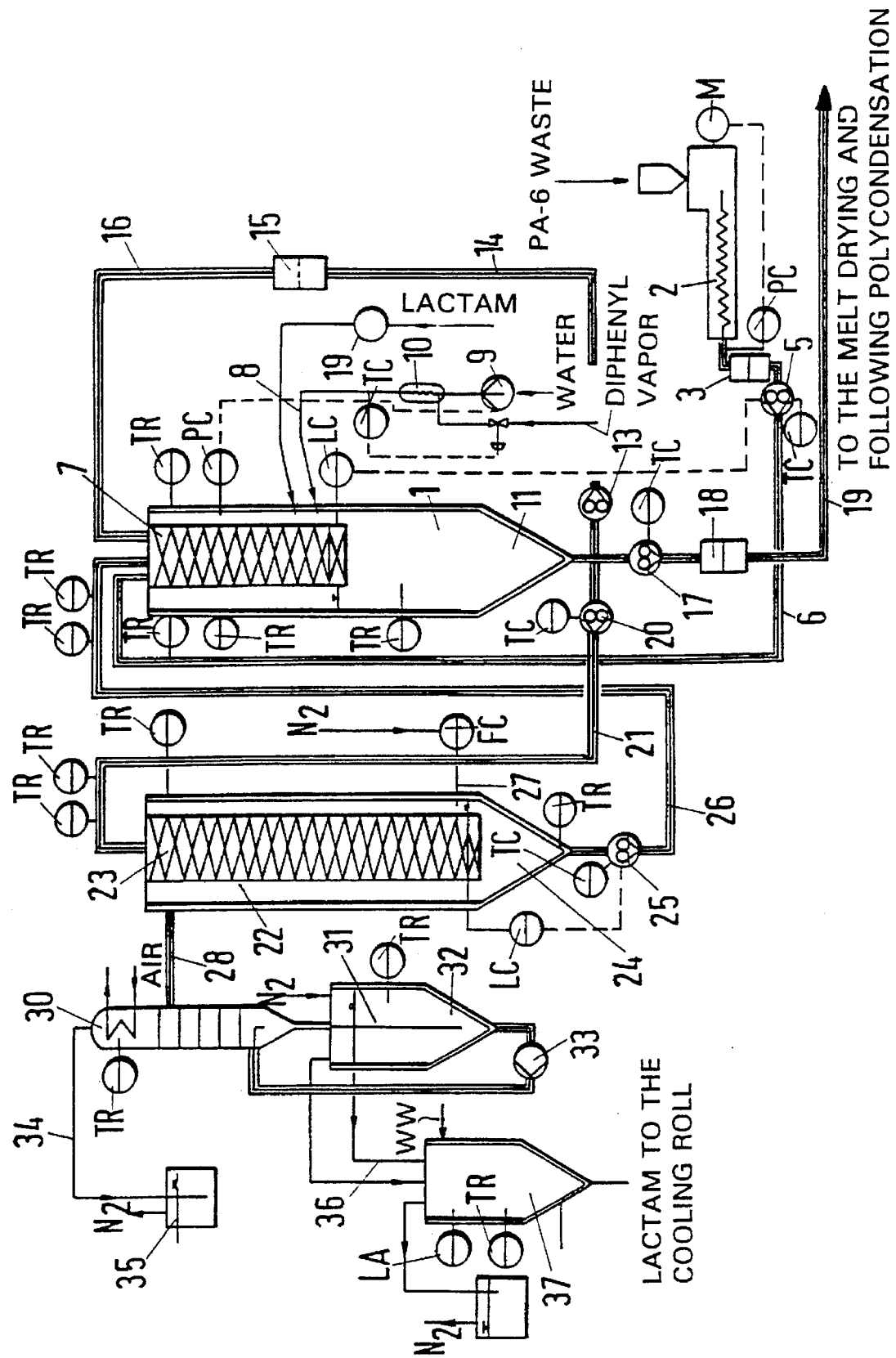

METHOD AND APPARATUS FOR THE PRODUCTION OF POLYAMIDE 6 FROM POLYAMIDE WASTE

This is a continuation of application Ser. No. 08/189,067 filed on Jan. 28, 1994 now abandoned.

BACKGROUND OF THE INVENTION

The present invention relates to a method for the production of polyamide 6 from polyamide waste and to an apparatus for the carrying out of this method.

In the production and processing of polyamide 6 pellets, polyamide 6 waste is produced which is to be further processed in order to improve the economy of the material.

Thus, polyamide 6 waste, if necessary comminuted, is melted down in an extruder and converted into a pelletizable strand. This process is frequently employed for the production of injection-molded pellets since the demands made on these pellets with respect to uniform molecular weight distribution and viscosity are not as great as on pellets which are to be worked into polyamide filament or film.

Furthermore, it is known to depolymerize polyamide waste down to the initial raw material, caprolactam. This method has the disadvantage that it is very detrimental to the environment and very expensive since phosphoric acid is used for the depolymerization and the lactam recovered must be repeatedly distilled to obtain a lactam of high purity. Furthermore, residues remain which must be disposed of.

From East German Patent 264,119, a method for the partial depolymerization of high-molecular polyamide 6 to caprolactam is known in which the caprolactam used as solvent and depolymerization agent is itself simultaneously polymerized, there being obtained therefrom a copolymer having a uniform, ordinary molecular weight distribution. Laboratory experiments have shown that while caprolactam is a good solvent for polyamide 6, it does not act as a depolymerization agent, which is also not possible from a standpoint of the chemism of the course of the polymerization. Only a solution mixture of high-molecular polyamide and lactam is produced. With a product temperature of about 270° C., a polyaddition reaction takes place, i.e. lactam adds onto the non-depolymerized, highly viscous polyamide molecules insofar as the latter are capable of reaction at all. In addition to this, high-molecular polyamide particles which are strongly crosslinked beyond the normal extent, so-called gel particles, are present in the resultant polymer; they are produced upon the cooling of the polyamide waste in the atmosphere of the air, cannot be broken down by the method described in East German Patent 264,119, and thus accumulate in the polyamide.

BACKGROUND OF THE INVENTION

The object of the present invention is to provide a method and an apparatus of the aforementioned type in which the material to be processed, such as polyamide 6 waste and/or oligomer-containing polyamide 6 waste, and/or oligomer-containing lactam residues, and/or oligomer-containing lactam and the high-molecular gel particles contained in the polyamide waste are brought to a low degree of polymerization.

In the method of the invention, the material, such as polyamide 6 waste and/or oligomer-containing polyamide 6 waste, and/or oligomer-containing lactam residues, and/or oligomer-containing lactam is passed continuously in molten condition at predetermined temperature through the pressure reactor, the internal pressure of which is controlled by the dosaged feeding of water or steam.

The water or steam can in this connection be introduced above the level of the melt in the pressure reactor together with the melt or separately therefrom by means of injection nozzles.

The material is preferably brought in the pressure reactor at 230 to 290 degrees Celsius to a uniformly low degree of polymerization, with a solution viscosity of more than 1.5.

Before and/or after passage through the pressure reactor, the melt, which preferably contains water can be conducted through a shearing filter, preferably of a fineness of 5–40 μm, which linearly deforms the crosslinked polyamide parts.

In this connection, the cyclic oligomers become more reactive by lengthening or are converted into reactive linear polymer compounds.

DETAILED DESCRIPTION OF THE INVENTION

In accordance with a preferred embodiment of the invention, the polyamide melt is subsequently brought to the desired degree of final polymerization in at least one subsequent after-condensation stage.

In this way, the low-viscosity polyamide is additionally condensed at normal pressure or under a vacuum after removal of water to form a higher-viscosity polyamide 6 which is suitable for the production of high quality filaments, threads, films, etc.

The shearing of the polyamide melt can be effected with the aid of metal-fiber filters having several layers of different fineness, or else with fine-pore sintered filters and fine sand filters, in which connection the spherical gels which are present as a result of the surface tension are deformed into elongated gels which can easily be split in a pressure reactor in the presence of water. In addition, at the same time, there is a splitting of the melted polyamide waste which has been introduced in dosaged amount into the pressure reactor to a low uniform degree of polymerization when this method is carried out in the pressure stage with constant concentration of water and up to the equilibrium condition. Upon the feeding of oligomer-containing lactam residues or oligomer-containing polyamide 6 waste into the pressure reactor, the cyclic oligomers in particular are converted into reactive linear polymeric compounds. The low-viscosity polyamide produced in the pressure reactor has an extract content of about 10.5%. Analyses of the extract have shown that, as compared with the polymerization of pure caprolactam, no more cyclic oligomers than customary are contained in the extract. The splitting process which takes place in the pressure reactor can be substantially accelerated if the melt is conducted over surface-enlarging elements.

The shearing of the polymer melt can, however, also be effected after the removal of the melt from the pressure reactor. Behind the first pressure stage there is a drying stage in which the pressure of the first stage is gradually reduced and water can be specifically removed from the melt. The elongated gel particles are split, also in this case, by the presence of water of the drying stage.

The solution of the invention has the following advantages over the known methods:

The method of the invention eliminates the entire depolymerization to caprolactam by means of the known methods. At relatively little expense, it is possible to produce a polyamide melt which is substantially free of gel particles so that high-quality products such as filaments, films, etc. can be produced. A further advantage is that the actual method of production and the waste recycling can possibly be carried out in a polymerization process.

Furthermore, in this continuous method, pure lactam can be obtained for further processing from at least a part of the melt at the outlet from the pressure reactor.

Embodiments of the invention will be explained in further detail below with reference to the embodiment of an apparatus for the carrying out of the method which is shown in the sole figure of the drawing, as well as on the basis of examples:

The polyamide 6 waste is prepurified, melted down in an extruder 2 to a constant temperature, and fed possibly through filtering screens 3 which serve for the removal of impurities not consisting of polyamide 6 and a metering pump 5, as well as a conduit 6, into a pressure reactor 1 in which the hydrolysis is to take place. At the inlet to the pressure reactor, the melt flows over a device 7 in the form, for instance, of expanded metal or perforated plates, which increases the active surface and by which the melt is divided into thin layers. By suitable adjustment of the metering pump 5, a constant product level can be maintained in the pressure reactor 1.

If lactam, which may also consist of oligomer-containing lactam residues, is to be processed in addition to or instead of the polyamide 6, this lactam is also introduced in constant quantities by a pump 19 into the upper region of the pressure reactor 1.

At the same time, water or steam is introduced into the pressure reactor 1 via an injection line 8 above the product space 11 in the lower region of the pressure reactor 1, a precise dosaging of this amount of water being effected by means of a pump 9. The dosaging is effected as a function of the pressure in the pressure reactor 1.

It may be advisable to have the injection line 8 discharge into the pressure container not above the product space but directly into the melt-feed line 6 at the inlet end, which, however, has not been shown.

In order to reduce or avoid losses of energy of the melt which is fed via the line 6, the temperature of the water or steam can be brought in a heat exchanger 10 to a value above the melting point of the polyamide 6.

On the other hand, it is, however, also possible to spray the water into the pressure reactor in liquid state, the vaporizing taking place as a result of the high temperature of the melt.

The melt passes continuously through the product space 11 of the pressure reactor and is hydrolyzed by the water, a constant water partial pressure of between, for instance, 1.1 bar and 10 bar (gauge) resulting due to the pressure-dependent feeding of the water.

The outlet end of the pressure reactor 1 can be connected optionally to one or more of three lines 14, 19, 21 which discharge the melt treated in the pressure reactor and/or feed it for further treatment.

A first path leads via a pump 13 and the line 14 to a shearing filter 15 and, via a return line 16, back again to the inlet side of the pressure reactor 1. The pump 13 delivers a constant quantity of the melt from the outlet of the pressure reactor to the shearing filter 15, the purpose of which is to linearly deform crosslinked polyamide particles, so-called gels, which, due to their surface tension, coalesce into lenticular or spherical particles. These gels are produced by oxygen bridges. The particles which have been linearly deformed by the shearing filter are then, like all stretched polymeric molecules, more easily hydrolyzable by water while, without the use of the shearing filter 15, the inside of the lenticular or spherical gels is practically non-hydrolyzable.

Another path for the further conducting of the melt leaving the pressure reactor 1 extends over a pump 17 to the outlet line 19. Via this pump 17 and the line 19, the hydrolyzed polyamide 6 melt which is at a constant low viscosity and in chemical equilibrium can be fed to a melt drying (not shown) and a following polycondensation stage. Between the pump 17 and the line 19, there may be inserted a further shearing filter which has the same action as the shearing filter 15 already described. With the use of this shearing filter, the polyamide 6 gels not taken up by the by-pass 13, 14, 15, 16 are subjected to the shearing action and hydrolyzed as a result of the water still present in the melt. The further shearing filter 18 can be dispensed with if the amount of melt which is shear-filtered via the by-pass is very great and very high demands as to quality are not made on the finished product.

A third path from the outlet of the pressure reactor 1 extends over a pump 20 and the line 21 to the inlet of a lactam-recovery apparatus 22. In this connection, it should be pointed out that the polyamide 6 melt leaving the product space 11 of the pressure reactor 1 is in chemical equilibrium and in this connection has a monomer content of about 12%, the value of this monomer content being dependent on the constant product temperature selected in the pressure reactor 1. At about 320° C., the monomer content amounts, for instance, to 16% while at 250° it amounts to about 9%. The lactam recovery apparatus 22 also has at its inlet a surface-enlarging device in the form of expanded metal or perforated plates by which the polyamide melt is divided into thin layers and flows to the sump 24. At the outlet of the sump 24 there is a pump 25 which returns the melt, via a line 26, to the top of the pressure reactor 1 and by the control of which a constant level of product is maintained in the lactam recovery apparatus 22.

A vacuum is applied or nitrogen introduced via a line 27 into this lactam recovery apparatus. In this way, the result is obtained that both lactam and steam are expelled. This lactam and steam flow from the top of the lactam recovery apparatus via a line 28, possibly together with nitrogen, into a separating column 30. From the top of the separating column 30, the steam, possibly together with the nitrogen, flows via a line 34 to a condenser 35.

The bottom of the separating column ends in a pipe 31 which dips into a lactam container 32 which collects the liquid lactam. In order to avoid polycondensation processes, circulation of the lactam is maintained between the collection container 32 via a pump 33 and the bottom of the separating column 30.

The lactam can flow over an overflow 37 from the collection container 32 to a storage container or to a lactam solidification device, for instance in the form of a cooling roll (not shown).

More specific examples for the carrying out of the method of the invention with the use of this apparatus are indicated below:

Example 1: Preparation of acetic-acid-stabilized polyamide 6 filament waste

The waste obtained upon the spinning of polyamide filament is melted down in the extruder 2, preparation oil which adheres to the waste being removed upon the melting process in the twin-screw extruder. The melt, which has a relative solution viscosity of 2.70, is fed through a shearing filter consisting of sintered metal-fiber non-woven cartridges graduated with respect to their fineness and having a final fineness of 15 μm continuously and regulated in level via the line 6 into the pressure reactor 1.

By relative solution viscosity, there is understood here the ratio of the time of passage through a capillary viscosimeter of the solution of 1 g of polyamide in 100 ml of 96.5% sulfuric acid at a temperature of 20°±0.1° to the passage time of this sulfuric acid.

500 kg of polyamide melt are fed per hour in the gas space of the pressure reactor 1 through the surface-enlarging device 7; in this particular case, this device is an expanded-metal basket, but expanded metal surfaces arranged in star shape or similar devices may also be used. The end of this device 7 dips into the surface of the melt. The water is fed, regulated in pressure, into the pressure reactor 1. By the feeding of water, a pressure of 8.5 bar (gauge) is established. After a dwell time of 3.0 hours with a product temperature of up to 280° C., a polymer having a relative solution viscosity of 1.55 is obtained.

This polymer is fed, via the pump 17 and a melt-drying path which consists of a single-path heat exchanger, into an after-condensation reactor which is operated at approximately atmospheric pressure and in which the excess water is driven off via a rectifier. The melt remains for 2 hours at a product temperature of 280° C. and is then cooled to 250° C. The total dwell time in the after-condensation reactor is 8 hours. An acid-stabilized polymer having a constant solution viscosity of 2.40 plus or minus 0.02 and containing a proportion of monomers (water-soluble extract) of 9.5% is obtained. The solution viscosity corresponds to an average degree of polymerization of about 140 (relative solution viscosity 2.4).

Example 2

The course of the process is similar to Example 1, only that the shearing filtration takes place at the outlet of the pressure reactor, but in front of the heat exchanger of the melt-drying path. There is also obtained a polymer having a solution viscosity of 2.40 and a percentage of monomers (water-soluble extract) of 9.5%.

Example 3

The course of the process is similar to Example 1. 400 kg of polyamide melt per hour are constantly fed into the pressure reactor 1. In addition, 100 kg of caprolactam per hour are entered continuously, adjusted in level, into this pressure reactor via the pump 5. The caprolactam contains 0.10% acetic acid. The caprolactam is distributed over the surface of the melt. Water is introduced, regulated in pressure, into the pressure reactor 1 at a reaction temperature of 280° C. A pressure of 8.5 bar (gauge) is established. The melt is sheared behind the pressure reactor but in front of the heat exchanger of the melt-drying path. The after-condensation takes place in the subsequent after-condensation reactor. A polymer is obtained having a solution viscosity of 2.40 plus or minus±0.02, and a percentage of monomers (water-soluble extract) of 9.5%.

Example 4

500 kg of oligomer-containing lactam per hour from the recovery plant, treated with 0.10% acetic acid, are fed continuously into the pressure reactor 1. Before entrance into the pressure reactor, this lactam is preheated to about 240° C. The lactam is distributed uniformly over the surface level of the reactor. As from the reactor, the further course of the process is similar to Example 3.

Example 5: Production of high-viscosity polyamide 6

Polyamide 6 waste having a relative solution viscosity of 2.60 is treated in principle in the same way as in Example 1 and fed into the pressure reactor 1.

300 kg of polyamide melt per hour are measured out and conducted through a surface-enlarging device 7 in the gas space of the pressure reactor 1. The end of this device 7 dips into the surface of the melt. The steam pressure is maintained under pressure control in the pressure reactor. For this, water is fed via the pump 9 into the pressure reactor. The excess water leaves the pressure reactor 1 via a return-flow column (not shown) which allows the lactam from the ascending vapor to flow back into the reactor, and a pressure-retention valve which is controlled via the system pressure in the pressure reactor 1. The pressure in the pressure reactor 1 is 1.0 bar (gauge).

This polymer is fed via the pump 17 into an after-condensation reactor operated at approximately atmospheric pressure. Within the gas space of the after-condensation reactor, there are installed surface-enlarging devices on which the polyamide 6 melt is intensively dewatered by means of nitrogen.

After a dwell time of 12 hours, the polyamide 6 leaves the after-condensation reactor with a temperature of 250° C. The relative solution viscosity is 3.3 and the monomer content is 10.2%.

The apparatus or parts thereof can also be used for the processing of waste from other plastics if the original plastics were synthesized by polycondensation, as can be noted from the following additional examples:

Example 6: Polyamide 6,6 waste (polyhexamethyleneadipamide)

By means of melt extruder 2 via the filtering screen 3 and by the pump 5, the molten polyamide waste is pumped at constant temperature, pressure regulated, via the line 6 into the pressure reactor 1, which forms a hydrolysis reactor. The pressure in the vapor space of the hydrolysis reactor is regulated by the dosaging of water or steam by means of the pump 9 via the line 8. The line 8 can also terminate in the line 6.

At the outlet of the hydrolysis reactor at most two paths are possible:

Path 1: Treatment by shearing filtration in the bypass over the line 14, the shearing filter 15, and the line 16, with the use of the same procedure as described above.

For the hydrolysis of molten polyamide 6,6 waste it is, however, advisable greatly to limit the time of treatment since polyamide 6,6 is damaged in the event of long dwell times already under the slightest action of oxygen. Therefore, the shearing filter 15 is preferably installed behind the filtering screen 3 or the pump 5. In this case, the bypass can be done away with. This is particularly advisable if either the extruder 2 or the pump 5 and the line 6 can economically provide the high-pressure loss for the shearing filtration.

Path 2: For the melt drying and after-condensation. The hydrolyzed polyamide 6,6 melt, which is present with a constant low viscosity in the chemical equilibrium, flows from the hydrolysis reactor outlet to the pump 17. This pump is replaced by a regulating valve (not shown) if no shearing filter 18 need be installed. A shearing filter 18 is not installed if the shearing filter 15 is installed in the line 6. In the after-condensation stage the degree of final polymerization is brought about by polycondensation with removal of water (melt drying).

Example 7: Wastes from polyamide 6 and polyamide 6,6

The two wastes can be processed together in the hydrolysis reactor. For a uniform final quality after the after-condensation, it is advisable to add the two types of waste to the extruder 3 in a constant quantity ratio or—preferably —to establish a constant quantity ratio by a separate line, in each case, consisting of extruder 2, filtering screen 3, and dosaging pump 5. Lactam, which may also consist of oligomer-containing recycled lactam or contain it, can also be fed in the hydrolysis reactor by the pump 19 in constant quantities or as a function of the product level in the hydrolysis reactor 1. If this product level is regulated by the feed of lactam, the feeding of the melt is effected via the pump/pumps 5 in constant quantities.

The pressure in the hydrolysis reactor 1 is controlled in the same way as in Example 5 by the feeding of water or steam. At the outlet of the hydrolysis reactor, the bypass shearing filtration in the filter 15 is dispensed with above a quantitative ratio of polyamide 6,6 waste to polyamide 6 waste of 2:8. The shearing filter is then installed in the line 6.

The path 2 leads from the outlet of the hydrolysis reactor 1 via a pump 17 or a regulating valve into the melt drying and after-condensation.

Example 8: Polyethyleneterephthalate (PET) waste

A glycolysis is carried out in the pressure reactor 1 forming a hydrolysis reactor. The molten PET waste is added, regulated in level, by means of the pump 5 via the line 6 into the hydrolysis reactor 1. Glycol is fed via the pump 9. The drive of the pump 9 is controlled in speed by the drive of the pump 9 so that constant quantity ratios are established between molten PET waste and glycol.

Since the PET melt is damaged by the action of oxygen, and only a very slight pressure is established by the addition of glycol, an inert atmosphere at constant pressure is established by means of nitrogen in the reactor. This can be done most easily from a technical standpoint by the bubbling through of small amounts of $N_2$ against an excess pressure valve which is set to constant pressure.

At the output of the reactor 1, the shearing filtration in the bypass is dispensed with if a shearing filter is installed in the line 6.

The low viscosity PET present in chemical equilibrium discharges at the outlet of the reactor 1 and is pumped by the pump 18 to the so-called finisher process (not shown) where glycol is expelled and polycondensed.

We claim:

1. A method for the depolymerization and reprocessing of material selected from the group consisting of polyamide 6 waste, oligomer-containing polyamide 6 waste, oligomer-containing lactim residues and oligomer-containing lactim, by hydrolysis in a pressure reactor with the addition of water, the method comprising the steps of melting said material and then continuously conducting it at predetermined temperature through the pressure reactor, controlling the inside pressure of the reactor by dosage feeding of water or steam such that the material in the pressure reactor is brought to 230°–290° C. to a uniformly low degree of polymerization with a solution of viscosity of more than 1.5, conducting the water-containing melt before, during or after passage through the pressure reactor, through a shearing filter which linearly deforms crosslinked polyamide particles and recovering linear polyamide which has a uniform low degree of polymerization.

2. A method according to claim 1, characterized by the fact that the water or steam is introduced into the pressure reactor together with the melt.

3. A method according to claim 1, characterized by the fact that, after passing through the pressure reactor, water is removed from the melt and the melt is then polycondensed and brought to a desired final degree of polymerization.

4. A method according to claim 1, characterized by the fact that at least a part of the melt is recycled from the outlet of the pressure reactor via a shearing filter to the inlet of the pressure reactor.

5. A method according to claim 1, characterized by the fact that at least a part of the melt is conveyed from the pressure reactor to a lactam recovery apparatus in which lactam is expelled from the melt and the remaining part of the melt is fed back into the pressure reactor.

6. A method according to claim 5, characterized by the fact that the lactam is expelled by the introduction of nitrogen or the application of a vacuum or both, and is fed to a separating column.

7. A method according to claim 1, characterized by the fact that the shearing of the molten material takes place in a multi-layer metal nonwoven.

8. A method according to claim 1, characterized by the fact that the shearing of the molten material takes place in a fine-pore sintered filter.

9. A method according to claim 1, characterized by the fact that the shearing of the molten material takes place in a fine sand filter.

10. A method for the depolymerization and reprocessing of material selected from the group consisting of polyamide 6 waste, oligomer-containing polyamide 6 waste, oligomer-containing lactim residues and oligomer-containing lactim, the method comprising the steps of melting said material and then continuously conducting it at predetermined temperature through a pressure reactor, hydrolyzing said material with an agent consisting of water or steam and controlling the inside pressure of the reactor by dosage feeding of said water or steam to bring said material to 230°–290° C., conducting the water-containing melt before, during or after passage through the pressure reactor, through a shearing filter which linearly deforms crosslinked polyamide particles and recovering linear polyamide which has a uniform low degree of polymerization with a solution viscosity of more than 1.5.

* * * * *